July 6, 1954
M. A. CROSBY
2,682,710
CONTINUOUS GAUGING APPARATUS
Filed Nov. 30, 1949
3 Sheets-Sheet 1
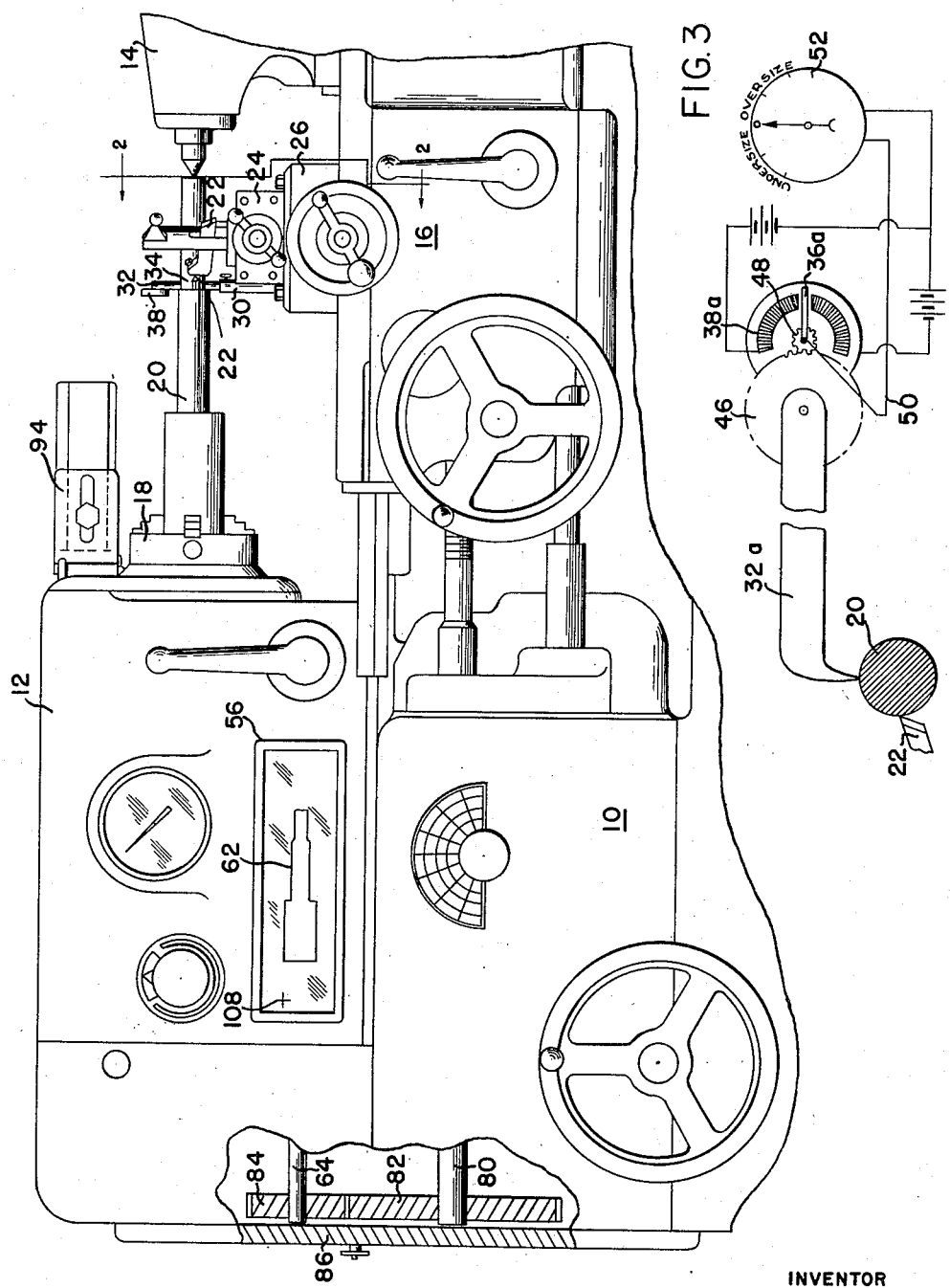
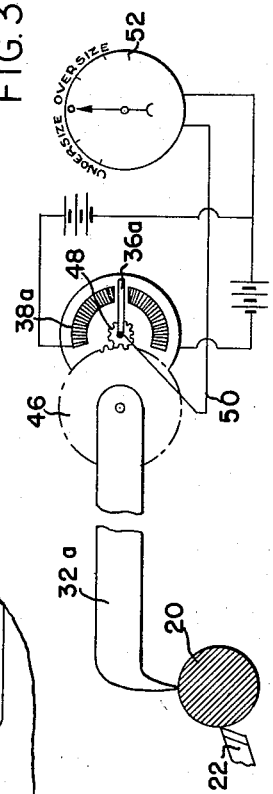
INVENTOR
MELVIN A CROSBY
BY
Toulmin & Toulmin
ATTORNEYS July 6, 1954    M. A. CROSBY    2,682,710
CONTINUOUS GAUGING APPARATUS
Filed Nov. 30, 1949    3 Sheets-Sheet 2
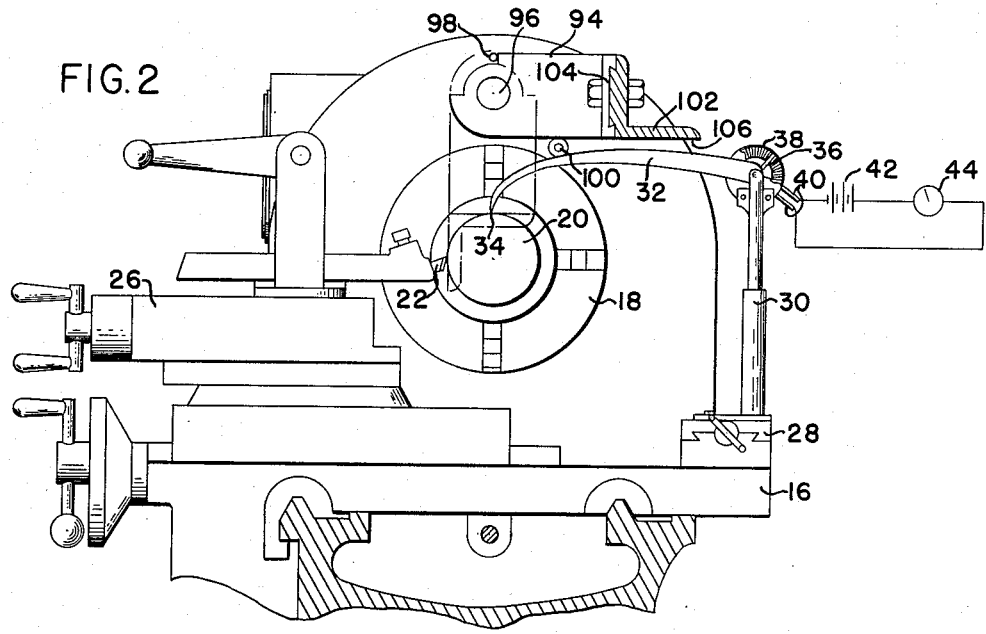
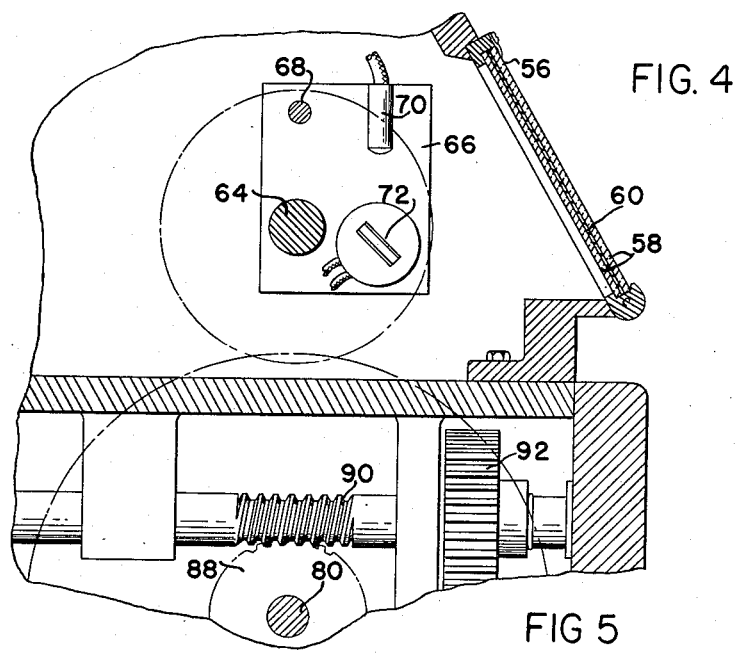
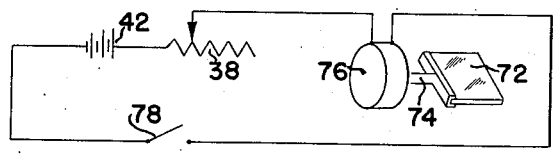
INVENTOR
MELVIN A. CROSBY
BY
Toulmin & Toulmin
ATTORNEYS July 6, 1954  M. A. CROSBY  2,682,710
CONTINUOUS GAUGING APPARATUS
Filed Nov. 30, 1949  3 Sheets-Sheet 3

INVENTOR
MELVIN A. CROSBY
BY
Toulmin & Toulmin
ATTORNEYS

Patented July 6, 1954

2,682,710

UNITED STATES PATENT OFFICE 2,682,710

CONTINUOUS GAUGING APPARATUS

Melvin A. Crosby, Cincinnati, Ohio, assignor to The Commonwealth Engineering Company of Ohio, Dayton, Ohio, a corporation of Ohio Original application January 25, 1947, Serial No. 724,319. Divided and this application November 30, 1949, Serial No. 130,190

7 Claims. (Cl. 33—181)

This invention relates to machine tools, and in particular to a control or indicating mechanism for machine tools for assisting the operator in the production of workpieces of the correct size.

This application is a division of U. S. Patent 2,640,274, issued June 2, 1953, to this inventor.

Heretofore, in connection with machine tools, for an operator to produce a workpiece of a certain configuration it was necessary for him to measure the said workpiece with gauges or micrometers from time to time and to compare his measurements with a blueprint or other standard. Another method employed for producing workpieces of a certain configuration is to have the machine fitted with contouring controls so that the workpieces are formed automatically by the machine in a continuous cycle according to a template or pattern.

In the latter case, a special machine is required, or auxiliary fittings are required so that the utility of the machine is definitely limited, and the change from one workpiece to another involves considerable set-up time and skill.

The particular object of the present invention is to provide means whereby a standard machine such as a lathe can readily be adapted for producing workpieces according to a predetermined configuration, and without the fitting thereto of expensive and extensive auxiliary equipment.

Another object is to provide mechanism in combination with a machine tool, such as a lathe, by means of which a continuous indication is given of the workpiece size throughout cutting operation.

Still another object of this invention is to provide means in association with a machine tool for producing a record of the machining of the workpiece which can be attached thereto for record and inspection purposes.

It is also an object of the present invention to provide means for adjusting the cutting tool of the machine and the indicating mechanism so that the operator can be certain at all times that the indications given by the indicator are correct.

These and other objects and advantages will become more apparent upon reference to the following description, taken in connection with the attached drawings, in which:

Figure 1 is a side elevation, partly broken away, of a lathe having auxiliary equipment according to this invention;

Figure 2 is a transverse section taken on the line 2—2 of Figure 1 and showing the cutting tool and indicating mechanism gauge;

Figure 3 is a diagrammatic view showing the electrical connections of one type of indicator mechanism;

Figure 4 is a fragmentary view showing the arrangement of another form of indicating mechanism;

Figure 5 is an electrical diagram of the indicator circuit of Figure 4;

General arrangement

Figure 6:
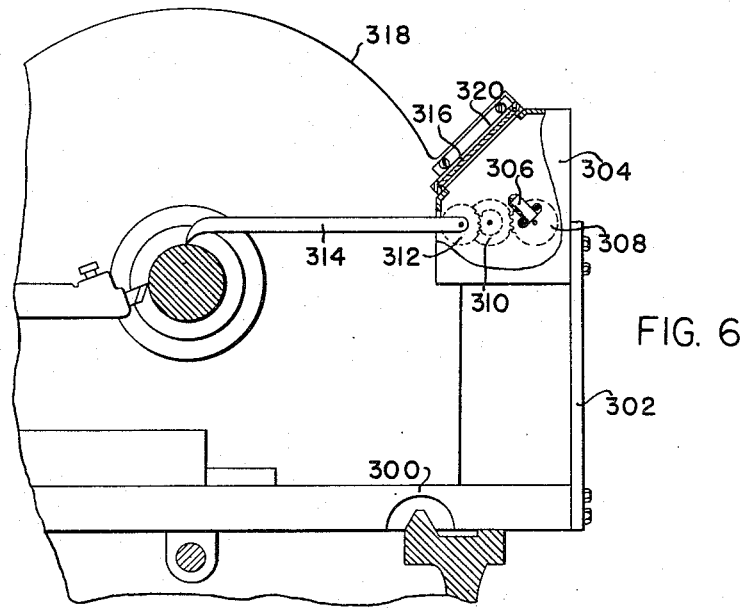
Figure 6 is a view similar to Figure 4 but showing a modified arrangement.

According to this invention, there is provided a machine tool having means for supporting a workpiece and a cutting tool for traversing and shaping the workpiece. Arranged to move relative to the work in the same manner as the aforementioned cutting tool does, is an indicating mechanism which continuously measures the workpiece, and either indicates the size thereof, records the size thereof, or indicates a variation in the workpiece from a predetermined pattern.

When the indicating device indicates the workpiece size, this indication may be compared with a chart or drawing carried on the machine, so that the operator has a continuous visual indication of the size of the workpiece being machined. By this he is enabled to make adjustments in the tool setting so that the turned workpiece is of the correct size and shape.

When the indicator makes a record of the workpiece size, the said record forms the visual indication, and the record may be attached to the workpiece after machining as a file record or for inspection purposes.

Another form of the invention utilizes a template or pattern, and the workpiece is continuously compared therewith and differences in size of the workpiece and the pattern are either indicated or recorded so that the operator can make the necessary adjustments of the tool.

The invention also contemplates the provision of a gauge on the machine tool frame which can be moved into position to permit the indicating mechanism and the tool to be set thereagainst so that when a new tool is placed in the machine, or when the tool is re-ground, it can be readjusted into its proper position relative to the indicator.

*Structural arrangement*

Referring to the drawings, Figure 1 shows a machine tool such as a lathe having a bed 10 which mounts a headstock 12, a tailstock 14, and a tool supporting carriage 16. The headstock may comprise workpiece holding means such as the chuck 18 so that a workpiece 20 can be driven in rotation relative to the tool 22 which is carried in the compound 24 mounted on the cross-slide 26 of the carriage 16.

According to this invention, and as best seen in Figure 2, the carriage 16 supports a longitudinally adjustable slide 28 on which is mounted a telescoping column arrangement 30. Pivotally supported at the upper end of the upper portion of the column 30 is a feeler arm 32 which engages the workpiece 20, as at 34.

The feeler arm 32 is connected with the movable portion 36 of an adjustable rheostat 38 that is connected by the wires 40 with a battery 42 and an indicating electrical instrument 44. It will be apparent that the indication of the instrument 44 will also be an indication of the position of the arm 32 relative to the supporting column 30, and, therefore, of the diameter of the workpiece 20. Thus, the size of the workpiece which is being turned can at any time be determined by the observation of the instrument 44.

As shown in Figure 1, the feeler arm 32 engages the workpiece somewhat to the rear of the cutting tool 22 in order that the said feeler arm will always ride on a surface which has been turned by the cutting tool.

In Figure 3, there is shown an arrangement wherein a feeler arm 32a is connected to drive a gear 46 which, in turn, runs on a smaller gear 48 that is connected with the movable arm 36a of a rheostat 38a. The rheostat 38a is of a divided type, and the arm 36a is connected by a wire 50 with one terminal of an instrument 52, while the ends of the separate resistance portions of the rheostat are each connected with one terminal of separate batteries, the other terminals of which are connected together and to the opposite side of the instrument 52 by a wire. The arrangement is such that movement of the feeler arm 32a in either direction will cause an indication on the instrument 52 of the amount of said movement.

Thus, if a cylindrical workpiece is being turned, or a flat surface is being machined, the arrangement shown in Figure 3 will be operable continuously to indicate any deviations from a predetermined workpiece size.

In connection with the arrangements shown in Figures 1 and 2, the machine is preferably provided with a viewing screen or window as at 56, best seen in Figure 4, which consists of an aperture adapted for receiving a pair of transparent or translucent plane members 58 which receive therebetween a transparent or translucent chart 60 on which is inscribed, drawn, or printed the workpiece outline, as indicated at 62 in Figure 1.

Within the headstock 12, there is a threaded spindle or screw 64 which carries a bracket 66 that may be guided in reciprocation as by the guide rod 68. The bracket 66 mounts a light source 70 which preferably comprises a light bulb and a condensing lens system so that a relatively fine pencil of light is thrown on an oscillatable mirror 72 whence the light deflects into the window opening 56, where it makes a trace on the chart 60 that the operator can compare with the workpiece outline 62.

The oscillatable mirror 72 is preferably supported on the shaft 74 of an electrical instrument movement 76 which is connected in series with the rheostat 38 and battery 42 of the circuit shown in Figure 2. Optionally, there may be provided a switch 78 by which the circuit may be interrupted, if desired. This circuit is illustrated in Figure 5 of the drawings.

The spindle or screw 64 is driven by an arrangement shown in Figures 1 and 4, wherein it will be seen that the feed rod 80 of the lathe extends into a compartment at the rear of the lathe where it carries a gear 82. The gear 82 meshes with another gear 84 which is connected to drive the spindle or screw 64. A cover 86 may be provided which can be removed in order to change the gears 82 and 84, thereby to change the ratio of speeds of the feed rod 80 and spindle 64, this being necessary when the workpiece is large so that a reduced sized image can be employed on the viewing screen.

Conversely, if the workpiece is quite small, then an enlarged image can be placed in the viewing screen and the spindle 64 be connected to run to drive the bracket 66 at a greater speed than that of the carriage 16.

In Figure 4 it will be seen that the feed rod 80 carries a gear 88 which is driven by the worm 90 that, in turn, is driven by a gear 92 from a suitable source of power carried in the machine bed.

It will be apparent that the foregoing arrangement provides for a continuous visual indication of the size of the workpiece being formed in the machine. The operator is enabled to observe at all times whether or not the workpiece is being formed properly. Furthermore, the visual indication is so located on the machine that a supervisor can check the operator's work at any time merely by observing the viewing screen.

In order to insure that the cutting tool and the feeler arm are properly adjusted relative to one another, there is preferably mounted on the headstock of the machine a bracket 94 that may be pivoted as at 96 to rotate between the full line position shown in Figure 2 and the dotted line position therein. A stop pin 98 positively stops the bracket in both of its positions of movement and a means such as the spring loaded plunger 100 may be employed for retaining the gauge in its upper position. The bracket includes an angular portion 102 having a pair of surfaces 104 and 106 at right angles to each other.

When the bracket is pivoted into its dotted line position, the tool and feeler arm may be adjusted relatively by resting the feeler arm on the surface 104 while bringing the cutting tool into engagement with the surface 106. Preferably, these surfaces include inscribed gauge marks on which the tool and the point of the feeler arm should rest.

With the tool and feeler arm in this position, the rheostat in circuit with the battery and instrument movement 76 is adjusted in order to bring the light beam into register with a predetermined gauge point on the viewing screen, which is indicated by the crossed lines at 108 in Figure 1. By using cross lines, the relative position of the tool and feeler arm in the axial direction of the workpiece can also be adjusted so that at all times there is a predetermined leading of the feeler arm by the tool.

This feature is of merit in the event that it is desired to turn tapers so that the chart mounted in the viewing aperture can be modified from the actual contour of the workpiece in order to give a true indication to the operator of the position of the tool relative to the work.

In Figure 6 there is shown an arrangement similar to that illustrated in Figures 1 through 5, except that the carriage 300 carries, by means of a bracket 302, a frame 304 within which is mounted the light source 306. The light source 306 is carried on a gear 308 which is connected by a gear train 310 with a gear 312 which is directly connected with a feeler arm 314. The light source 306 projects a beam of light directly onto a viewing screen 316 which is stationarily supported on the headstock 318, as by a bracket 320.

It will be apparent that the arrangement shown in Figure 6 operates in a manner substantially identical with the other modifications except that the connection between the light beam and the feeler arm is direct instead of through a multiplying electrical circuit.

Figure 7:
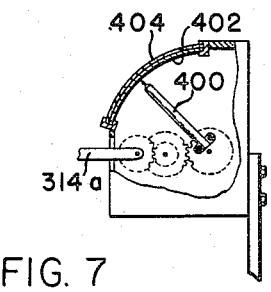
Figure 7 is a view illustrating still another modification.

Figure 7 shows an arrangement which is similar to the arrangement in Figure 6, and in which similar parts are identified by the same reference numerals with the addition of a subscript "a," except that the light beam is replaced by an inscribing member 400 which traces a visible line on a chart 402 carried on the back of a curved glass 404 mounted in the viewing aperture. As before, the glass 404 and chart 402 may be transparent or translucent, so that the operator can actually see the trace of the inscriber 400 at it is actuated by movements of the feeler arm 314a.

It will be apparent from the foregoing that the present invention provides means for continuously gauging a workpiece which is being formed in a machine tool, and of continuously indicating or recording, or both indicating and recording the exact size of the workpiece for the benefit of the machine operator or supervisor.

It will be understood that this invention is susceptible to modification in order to adapt it to different usages and conditions, and, accordingly, it is desired to comprehend such modifications within this invention as may fall within the scope of the appended claims.

I claim:

1. In an indicating device for a machine tool, said machine tool having workpiece supporting means and tool supporting means movable longitudinally thereto; workpiece feeling means adapted for mounting on said tool supporting means and adapted for continuously engaging a workpiece in said workpiece supporting means being shaped during said longitudinal movement, a carriage, tracing means movably mounted on said carriage, means adapted for connecting said carriage with said tool supporting means for movement of the carriage in unison with said tool supporting means, means connecting said tracing means with said feeling means for moving said tracing means on said carriage in response to movement of said feeling means in following the outline of the workpiece being shaped, and means under the influence of said tracing means for describing the outline of the workpiece as it is shaped during the forming thereof.

2. In an indicating device for a machine tool, said machine tool having workpiece supporting means and tool supporting means movable axially thereto; workpiece feeling means adapted for mounting on said tool supporting means and adapted for continuously engaging a workpiece in the said workpiece supporting means being shaped and in the region where the workpiece is engaged by the shaping tool during said axial movement, a carriage in said machine adapted for connection with said tool supporting means, so as to be movable in unison with the movements of said tool supporting means axially of the said workpiece, tracing means mounted on said carriage tiltable thereon about an axis parallel to the direction of movement of said carriage, means connecting said tracing means with said feeling means whereby movement of said feeling means will produce a corresponding movement of said tracing means, and a curved screen on which the tracing means traces an outline of the workpiece during movement of said carriage and tracing means.

3. An arrangement according to claim 2 in which the screen is a portion of a cylinder having its axis coinciding with the axis about which said tracing means is tiltable.

4. In a size indicating device; a feeler support movable longitudinally along a workpiece to be indicated, a feeler movably carried by said support adapted for engaging the workpiece during said movement and movable on the support angularly to the direction of movement of said support in response to changes in size of the workpiece, a carriage, means drivingly connecting said carriage with said support for movement therewith, tracing means mounted on the carriage tiltable thereon about an axis parallel to the direction of movement of the carriage, means connecting said tracing means with said feeler for movement of the tracer means in unison with the feeler as the feeler moves on said support following the longitudinal outline of a workpiece being indicated, and a stationary viewing screen on which the tracing means traces a path during movement of said carriage and said tracing means to give a continuous outline of the workpiece while it is being worked upon.

5. An arrangement as called for in claim 4 in which the said tracing means includes means to project a beam of light on the back of said viewing screen, and said viewing screen being a translucent element.

6. An arrangement as called for in claim 5 in which said viewing screen is formed as a portion of a cylinder about the said axis about which said tracing means is tiltable.

7. In an indicating device for a machine tool having workpiece supporting means and tool supporting means movable longitudinally thereto, workpiece feeler means adapted for mounting on said tool supporting means and adapted for continuously engaging a workpiece in said workpiece supporting means during said longitudinal movement, a viewing screen having a chart thereon inscribed with the outline the workpiece will have when completed, a carriage positioned behind said screen and including projecting means for projecting a beam of light on said screen, means adapted for operation by movement of said tool supporting means and workpiece supporting means for moving said carriage and said viewing screen in one direction in synchronism with the relative movement of said workpiece supporting means and said tool supporting means, and means for moving said projecting means and viewing screen in another direction in synchronism with the movements of said feeler means whereby the tracing on said screen conforms with the outline of the workpiece detected by said feeler means.

References Cited in the file of this patent

UNITED STATES PATENTS

| Number | Name | Date |
|---|---|---|
| 952,588 | Stevens | Mar. 22, 1910 |
| 1,404,545 | Richardson | Jan. 24, 1922 |
| 1,835,807 | Parker | Dec. 8, 1931 |
| 1,926,603 | Stowell | Sept. 12, 1933 |
| 1,992,027 | Green | Feb. 19, 1935 |
| 2,197,308 | Kolb et al. | Apr. 16, 1940 |
| 2,270,728 | Foster | Jan. 20, 1942 |
| 2,305,264 | Leonard | Dec. 15, 1942 |
| 2,372,470 | Bergstrom et al. | Mar. 27, 1945 |
| 2,398,562 | Russell | Apr. 16, 1946 |
| 2,468,395 | Fredin | Apr. 26, 1949 |
| 2,472,348 | Skinner | June 7, 1949 |
| 2,500,726 | Westhaver | Mar. 14, 1950 |
| 2,504,249 | Bruce | Apr. 18, 1950 |
| 2,538,622 | Johnson | Jan. 16, 1951 |
| 2,555,447 | Klepal | June 5, 1951 |